US008345005B2

(12) United States Patent
Jaouen

(10) Patent No.: US 8,345,005 B2
(45) Date of Patent: Jan. 1, 2013

(54) PUSH-DETECTING HALL EFFECT MINI-JOYSTICK AND CORRESPONDING CONTROL DEVICE

(75) Inventor: Jean-Yves Jaouen, Saint Jean la Poterie (FR)

(73) Assignee: Guillemot Corporation S.A., Cantepie Cedex (FR)

( * ) Notice: Subject to any disclaimer, the term of this patent is extended or adjusted under 35 U.S.C. 154(b) by 506 days.

(21) Appl. No.: 12/704,698

(22) Filed: Feb. 12, 2010

(65) Prior Publication Data

US 2010/0201622 A1 Aug. 12, 2010

(30) Foreign Application Priority Data

Feb. 12, 2009 (FR) ..................................... 09 50905

(51) Int. Cl.
*G06F 3/033* (2006.01)
*G09G 5/08* (2006.01)

(52) U.S. Cl. ....................................... 345/161; 345/156

(58) Field of Classification Search .................. 345/156, 345/161–173

See application file for complete search history.

(56) References Cited

U.S. PATENT DOCUMENTS

| | | | | |
|---|---|---|---|---|
| 2003/0122779 | A1 * | 7/2003 | Martin et al. | 345/156 |
| 2004/0012560 | A1 * | 1/2004 | Jasso et al. | 345/156 |
| 2007/0229455 | A1 * | 10/2007 | Martin et al. | 345/156 |
| 2010/0153845 | A1 * | 6/2010 | Gregorio et al. | 715/702 |
| 2011/0102162 | A1 * | 5/2011 | Gregorio et al. | 340/407.2 |
| 2011/0102340 | A1 * | 5/2011 | Martin et al. | 345/173 |

* cited by examiner

*Primary Examiner* — Ricardo L Osorio

(74) *Attorney, Agent, or Firm* — Blakely, Sokoloff, Taylor & Zafman LLP

(57) ABSTRACT

The invention relates to a mini joystick including a handle which can be moved in relation to a body, in rotation along at least two axes of rotation.

According to the invention, such a mini-joystick includes a Hall effect movement detection set including at least one first element interdependent in rotation with said handle and at least one second element fixed in relation to said body, said elements belonging to the group including the sensors and the magnets, delivering at least one item of information regarding the position of said handle, and detection means for detecting at least one push applied onto an upper part of said handle, able to deliver at least one item of control information when a push is applied, whatever the position of said handle in relation to said body.

23 Claims, 4 Drawing Sheets

PUSH-DETECTING HALL EFFECT MINI-JOYSTICK AND CORRESPONDING CONTROL DEVICE

1. FIELD OF THE INVENTION

The field of the invention is that of interactive hardware and accessories for microcomputers and game consoles, in particular.

More precisely, the invention relates to "mini-joysticks", or "mini-sticks", which may for example be installed on a gamepad or on a joystick, in one or more copies.

When referring to a "mini-joystick" herein, we are speaking of a device of reduced size in relation to a joystick, modified to fit within the user's hand, featuring a handle which extends beyond its support by several millimeters, for example, and which can be controlled by one of the user's digits, the thumb for example, to apply rotations along two perpendicular axes.

2. PRIOR ART

Such mini-joysticks have existed for many years. In broad outline, they include a fixed body, onto which is mounted a handle which can be moved in two directions (x, y), defining a grid perpendicular to the $z_{neutral}$ axis defined by the handle when it is in a neutral position, that is to say when no movement is being applied up on it by the user.

Means for measuring the handle's movements are incorporated, in order to deliver the corresponding control signals. These signals are generally converted into digital signals and transmitted either by wired or wireless means to a data processing device, such as a computer or a game console, so that the data processing device interprets these movements of the handle according to the software used.

Generally, these movements are measured using two potentiometers, measuring movements along the x and y axes, respectively.

These potentiometer-based measurement systems present a number of drawbacks. In particular, depending on the applications involved, they may prove to be insufficiently precise, and sometimes have an insufficient working lifespan. As a result of wear on the potentiometers, the mini-stick may lose its calibration, or even cease to function. Moreover, as a result of their potentiometers, potentiometer-based mini-sticks include a central dead zone.

Additionally, potentiometer-based mini-sticks generally have a slackness in their movements along the x and y axes, owing to an insufficiently strong re-centering force. If, however, the reverse is the case and the re-centering force is too strong, there is a risk of skipping values around the central dead zone.

Moreover, the ability to include a "push" function is often seen as desirable: that is to say, a function for detecting a push applied onto the handle, for example to confirm an operation, enable a function, or carry out a progressive action (for example: zooming, braking, etc.). This push-detecting function is difficult to implement, however, particularly in mini-joysticks, whose dimensions are by nature very reduced. A solution has been proposed, in the potentiometer-based systems described above, which consists of offsetting a contact, which is then activated by a rod extending underneath the handle. Pressing on this handle therefore acts on the rod, which transmits this action to the offset contact.

This approach, however, has proved to be both imprecise and inefficient, particularly when the handle is not in the neutral position, with the resulting risk of it being pushed inadvertently. In other words, it is not easy to simultaneously apply a rotational movement and a controlled push. Moreover, current systems do not allow for progressive reading of the push applied onto the handle by the user (in these systems, only the rotational movements are read progressively).

Generally speaking, the manufacturing of mini-joysticks must take into account a variety of constraints, such as a small overall size, a reasonable manufacturing cost, simple assembly and adjustment, as well as significant sensitivity and precision, amongst other factors.

Difficulties are also encountered in terms of responding to ergonomic requirements (the sensitivity is different in relation to a standard hand-operated joystick, since with a mini-joystick the same digit on the user's hand is employed for all of the actions in the different directions, resulting in an accumulation of simultaneous actions; and, moreover, it is important to avoid fatiguing the digit in question).

We must also take into account the fact that the hand whose digit is operating the mini-joystick is also being used for other actions, which may make accidental or untimely pushes upon the mini-joystick more likely. For example, in the case of a throttle: for certain actions in a video game, the user is obliged to pull down on and/or push a handle including the mini-joystick forward, and the user will not necessarily have the ability to let go off this handle in order to employ the mini-joystick, nor to move their digit to another location. However, it must not be the case that in manipulating this handle, doing so results in an unintentional push on the mini-joystick.

It is therefore more technically complicated to design a small-scale system which is precise, offering good playability when used in a video game, and which is sturdy, all without resulting in excessive fatigue for the user.

In the field of video games, the feel and response experienced by the gamer with respect to a control device is important (for example: no slackness, no neutral zone within ranges of action, etc.).

A need therefore exists for a new type of mini-joystick.

3. OBJECTIVES OF THE INVENTION

An objective of the invention is therefore to offer such a new joystick, overcoming at least some of the drawbacks listed above, in particular. More precisely, an objective of the invention is, according to at least one embodiment, to offer a mini-joystick, for use in a joystick or gamepad in particular, which provides good sensitivity as well as good precision.

Another of the invention's objectives, according to at least one embodiment, is to offer such a mini-joystick, which can provide a progressive reading of the push applied onto the handle.

Another of the invention's objectives, according to at least one embodiment, is to offer such a mini-joystick, which can allow its manufacturer, or even the user as the case may be, to adapt its precision and/or its sensitivity with respect to the push, depending on the application of the mini-joystick and on the digit which will operate it.

Another of the invention's objectives, according to at least one embodiment, is to offer such a mini-joystick, which is relatively simple to manufacture, to assemble and/or to adjust, and which provides a satisfactory working lifespan.

Another of the invention's objectives, according to at least one embodiment, is to offer such a mini-joystick, whose overall size is reduced.

Yet another of the invention's objectives, according to at least one embodiment, is to offer such a mini-joystick, providing good qualities in terms of ergonomics, user comfort and precision.

4. SUMMARY OF THE INVENTION

These objectives, as well as others to be detailed hereinafter, are achieved using a mini-joystick including a handle which can be moved in relation to a body, in rotation along at least two axes of rotation.

According to the invention, such a mini-joystick includes a Hall effect movement detection set including at least one first element interdependent in rotation with said handle and at least one second element fixed in relation to said body, said elements belonging to the group including the sensors and the magnets, delivering at least one item of information regarding the position of said handle, and at least one detection means for detecting at least one push applied onto an upper part of said handle, able to deliver at least one item of control information when a push is applied, whatever the position of said handle in relation to said body.

Thus, the invention makes it possible to simultaneously obtain very good precision in measuring movement, while avoiding the presence of a central dead zone, thanks to the Hall effect, along with a push detection function, available in any of the handle's positions (including in an extreme inclination position), and not only when the handle is in its neutral position. These two functions are independent, which is to say that the handle can also be moved whether or not a push is applied, without the loss of any precision or comfort.

According to one embodiment of the invention, said handle includes at least one mobile element sliding along the axis of said handle or along the axis of said body, so as to allow for at least one resting position and at least one control position, in which said detection means delivers an item of control information.

The sliding movement is possible whatever the inclination position of the handle. A push on the handle will therefore ensure the sliding action, and the detection of the control position, as a "click" and/or as the determination of a value roughly proportional to the force of the push or to the movement measured by said detection means.

Said detection means may include at least one sensor for a stress applied to said handle.

In this case, it is preferable that the handle does not slide or only slides along a short range of travel when pressed upon (as stress measurement only begins when the handle is abutting).

According to another particular aspect of the invention, the mini-joystick may include at least one ball joint including two ball joint elements of roughly the same radius, namely a head and a cup, one element being able to pivot around the center of the other element, with a first of said ball joint elements being fixed in relation to said body, and a second of said ball joint elements being interdependent with said handle (interdependent in such a way that, in an example of embodiment, this second of said ball joint elements can move in rotation along at least two axes of rotation as the handle can move in rotation along these at least two axes of rotation following a movement of rotation applied to the handle, while the handle can slide along a slide guide formed inside of the second of said ball joint elements).

This mechanism allows for precise and reliable control of rotational movement.

According to one embodiment, the head is connected to the handle. Thus, in this case, said cup is formed in said body or a piece attached to said body, and said head is guided in movement in relation to said cup by said handle.

In this case in particular, said head may feature at least one slide guide, in which a portion of said handle is mobile in sliding.

This slide guide may be a bore, for example, or a prismatic type guiding element, or a splined shaft, or even a double column. A type of slide guide may be selected which prevents any rotation.

We may also stipulate that the receiving zone of a control device receiving said mini-joystick features at least one slide guide, in which at least a portion of said body is mobile in sliding, to ensure the same function.

According to another embodiment of the invention, the mini-joystick includes a handle which can be moved in relation to a body, in rotation along at least two axes of rotation, and also includes:

- at least one ball joint including two ball joint elements of roughly the same radius, namely a head and a cup, one of the elements being able to pivot around the center of the other element,
- a first of said ball joint elements being fixed in relation to said body, and a second of said ball joint elements being interdependent with said handle,
- a Hall effect movement detection set including at least a first element attached on the inside of the said second of said ball joint elements and interdependent in rotation with this ball joint element, and at least a second element fixed in relation to said first of said ball joint elements, said (detection) elements belonging to the group including the sensors and the magnets, delivering at least one item of information regarding the position of said handle,
- at least one detection means for detecting at least one push applied on the upper section of said handle, able to deliver at least one item of control information when a push is applied, whatever the position of said handle in relation to said body.

According to another embodiment of the invention, said detection means includes a control sensor mounted:

- either on a support interdependent in rotation with said handle, and therefore interacting with the portion of said handle that is mobile in sliding;
- or on a support attached to a receiving zone of a control device receiving said mini-joystick, and therefore interacting with the portion of said body which is mobile in sliding.

In particular:

- when said control sensor is mounted on said support interdependent in rotation with said handle, it can be mounted in such a way that it extends in line with said handle, whatever the position of said handle in relation to said body;
- when said control sensor is mounted on said support attached to a receiving zone of a control device receiving said mini-joystick, it can be mounted in such a way that it is able to work in conjunction with the portion of said body which is mobile in sliding, whatever the position of said handle in relation to said body.

This control sensor may for example belong to the group including:

- the contacts, and for example the push buttons;
- the optical sensors;
- the force sensors;
- the piezoelectric sensors;
- the Hall effect switches.

According to another particular feature of the invention, said Hall effect movement detection set may include a triaxial sensor and a magnet to deliver positional information along said two axes.

In particular, this Hall effect movement detection set may include a single triaxial sensor and a single magnet to deliver positional information along said two axes. In this case, said sensor and said magnet would preferentially be aligned along the axis of said handle, when the handle is in a neutral position.

This alignment allows us to obtain a good linear reading of the handle's position. The alignment is favorably implemented in relation to the Hall effect plate which is in the component.

According to a particular embodiment, said head includes an interior space to house said support interdependent in rotation with said handle.

In particular, this support may be a printed circuit also including the, or at least one of the said, first element(s) of said movement detection set.

According to a particular embodiment, said cup is formed in said body, and said body features a shoulder able to work in conjunction with a stop formed on said head to limit the movement of the latter.

According to another particular feature of the invention, the mini-joystick includes primary return mechanisms, tending to return at least said upper portion of said handle to a resting position, in which no push is detected.

Secondary return mechanisms may also be implemented, tending to return said handle to a neutral position, in which no rotational movement is applied.

In this case, the primary and secondary return mechanisms may include two concentric coil springs, for example.

According to another particular feature of the invention, the head may include holding means by way of clipping of said handle and/or of said support.

Mounting and assembly are therefore ensured in a simple and reliable manner.

According to another particular feature of the invention, the head and/or the body may include recesses.

In particular, these recesses may allow for lightening of the mini-joystick, for the formation of vents and/or for defining where electrical wires can be passed through.

Moreover, the exterior surface of said body may include at least one guiding and/or holding element, able to work in conjunction with a receiving zone of a control device receiving said mini-joystick.

This allows us to facilitate the assembly and/or prevent any rotation of the mini-joystick in the device.

The invention also relates to control devices, for example such as joysticks, throttles or gamepads, microcomputers (in particular, desktop computer keyboards, and portable computers), telephones or digital audio players, equipped with at least one mini-joystick as described above.

5. LIST OF FIGURES

Other features and advantages of the invention will be revealed more clearly upon reading the following description of a preferential embodiment of the invention, provided by way of illustration only and non-restrictive in nature, and the appended figures, among which:

6. DETAILED DESCRIPTION OF ONE EMBODIMENT

Overview of the Invention

Figure 1:
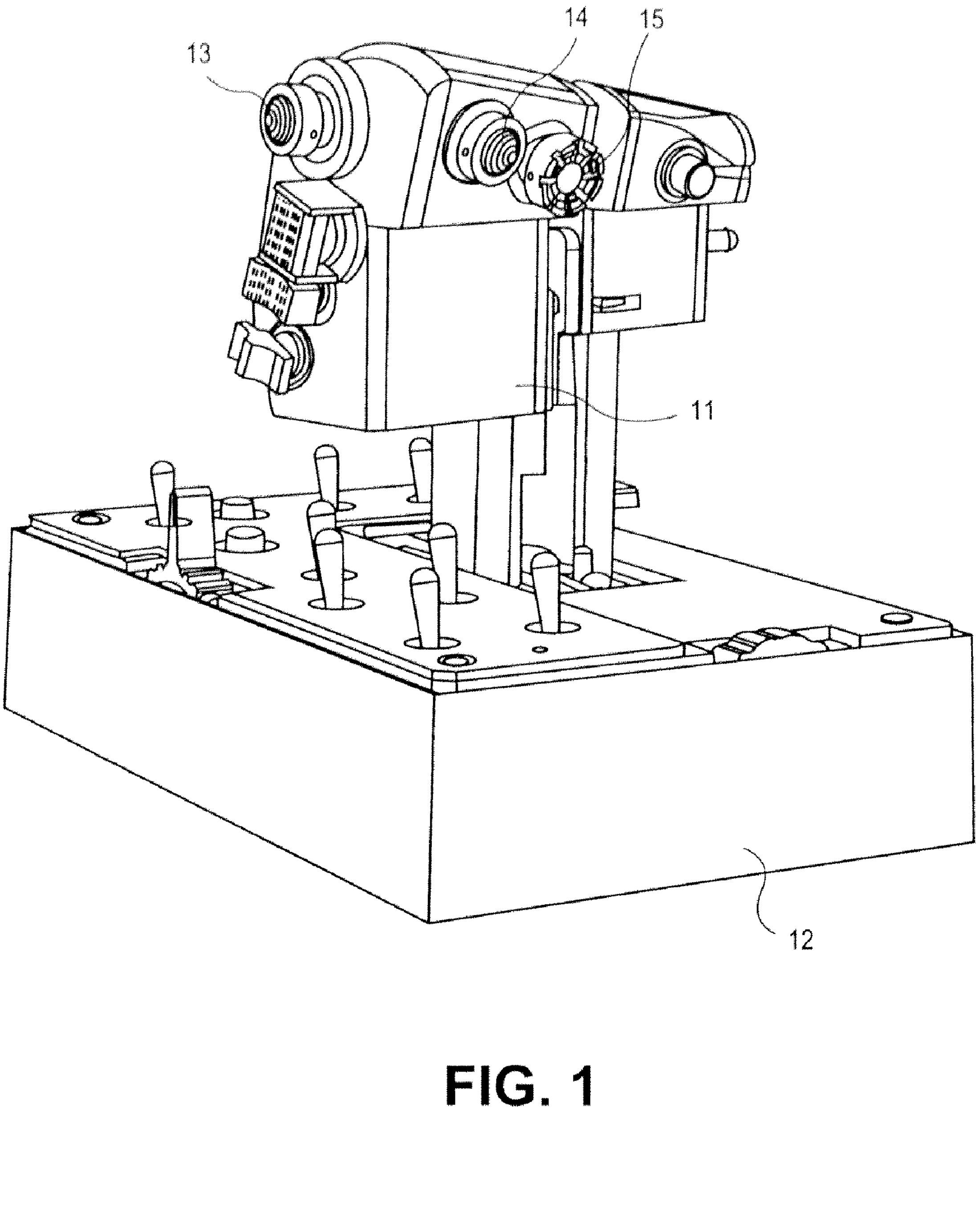
FIG. 1 illustrates an example of a throttle (a control device allowing for control of a motor system) which may be equipped with mini-joysticks according to the invention.

The invention therefore relates to a new type of mini-joystick, or mini-stick, implementing a Hall effect movement detection system, and a "push" function (push detection) which can be used whatever the position of the mini-joystick's handle.

According to one embodiment of the invention, said mini-joystick includes at least one element which is mobile in sliding, mobile in reaction to a push applied by the user, in such a way as to allow for at least one resting position and at least one control position, in which said detection means delivers control information.

According to one embodiment, the body of the mini-joystick may slide in a receiving zone of a control device receiving said mini-joystick. In this case in particular, said receiving zone, or receptacle, may include at least one slide guide, in which a portion of said body is mobile in sliding.

According to one particular aspect, in order to allow for sliding which is not only along the axis of the body, the set composed of the mini-joystick and the receiving zone of the device receiving the mini-joystick may include at least one ball joint including two ball joint elements of roughly the same radius, namely a head and a cup, one of the elements being able to pivot around the center of the other element, a first of said ball joint elements being fixed in relation to said receptacle, and a second of said ball joint elements being attached to said body.

In particular, the lower portion of the body may include a head working in conjunction with a cup present in said receptacle or formed in the receiving zone of the device receiving the mini-joystick; or, conversely, the lower portion of the body may include a cup working in conjunction with a head present in said receptacle or formed in the receiving zone of the device receiving the mini-joystick.

According to another particular feature of the invention, said receiving zone includes return mechanisms, tending to return at least said element able to pivot around the center of the other element (head or body) to a resting position, in which no push is detected. A push on the handle may thereby ensure a sliding movement, and the detection of the control position, as a "click" and/or as the determination of a value which is progressive in relation to the force of the push or to the movement of said body, measured by said detection means. According to one embodiment of the invention, said detection means includes a control sensor mounted on a support attached to said receiving zone, interacting with the portion of said body which is mobile in sliding (for example, one or more Hall effect sensors interacting with a magnet placed in the extension of the body at the extremity of its lower portion).

For example, one or more Hall effect sensors may be borne on a printed circuit placed, and attached by clipping or using screws, in said receiving zone; or, where the set composed of the mini-joystick and the receiving zone of the device receiving the mini-joystick includes a ball joint, the printed circuit bearing this sensor or sensors may be placed and attached by clipping or using screws, in an interior space built into the ball joint element which is fixed in relation to said to receiving zone, or built into said device receiving the mini-joystick. Such a device may be a joystick, for example, as described in the FR-09 50025 patent application document.

According to another embodiment of the invention, said detection means includes a control sensor mounted on the portion of said body which is mobile in sliding, and interacting with said receiving zone. In particular, said control sensor may be mounted on a portion of said body which is mobile in sliding, in such a way that it extends into the extension of said body and interacts with said receiving zone.

Said detection means may include at least one control sensor, which may, for example, belong to the group including:

- the contacts, and for example the push buttons;
- the optical sensors;
- the force sensors;
- the piezoelectric sensors;
- the Hall effect switches,
- the stress sensors.

In the case of stress sensors, these sensors sense the stress applied on said body (and/or on said handle) and, preferably, the body does not slide or only slides over a short distance when the handle is pushed (as stress measurement only begins when the element or elements which are mobile in sliding—the body and the handle—have reached an abutting position). There is therefore no need for an element which is mobile in sliding where a stress sensor is employed, but the presence of an element which is mobile in sliding in reaction to the force applied by the user contributes to improving the feel experienced by the user: the user physically feels that the mini-joystick is reacting to his or her push. Without a mobile element, the user can only virtually perceive that the mini-joystick is reacting to his or her push (for example, by noticing on a computer or television screen that their character in a game is running more quickly).

Embodiment Example

FIG. 1 illustrates, by way of example, a throttle (for example, used to control the motor system of an aircraft in a flight simulator), which may be equipped with one or more mini-joysticks according to the invention. The device in question could also be a joystick or a gamepad, in particular.

More precisely, the device in FIG. 1 is a throttle for a flight simulation system, which may be accompanied by a joystick.

At the top of the levers, the throttle 11 features handles which include a significant number of actuators, buttons and switches, allowing the pilot to control most elements of the aircraft without taking his or her hands off of the flight controls: this is the "Hands on Throttle And Stick" concept.

The throttle 11 can be moved in relation to a base 12, equipped with different buttons and settings elements.

The throttle 11 also features a variety of actuators, including three mini-joysticks 13, 14 and 15, at least one of which may be a mini-joystick according to the invention.

Each of these mini-joysticks is covered with a piece which is generally circular in form, and adapted to being manipulated by one of the user's digits, said piece being referred to as a hat.

In the example in FIG. 1, the throttle is designed to be manipulated with the left hand, and the mini-joystick 13 can be controlled with the thumb, the mini-joystick 14 with the forefinger, and the mini-joystick 15 with the middle finger.

Figure 2A:
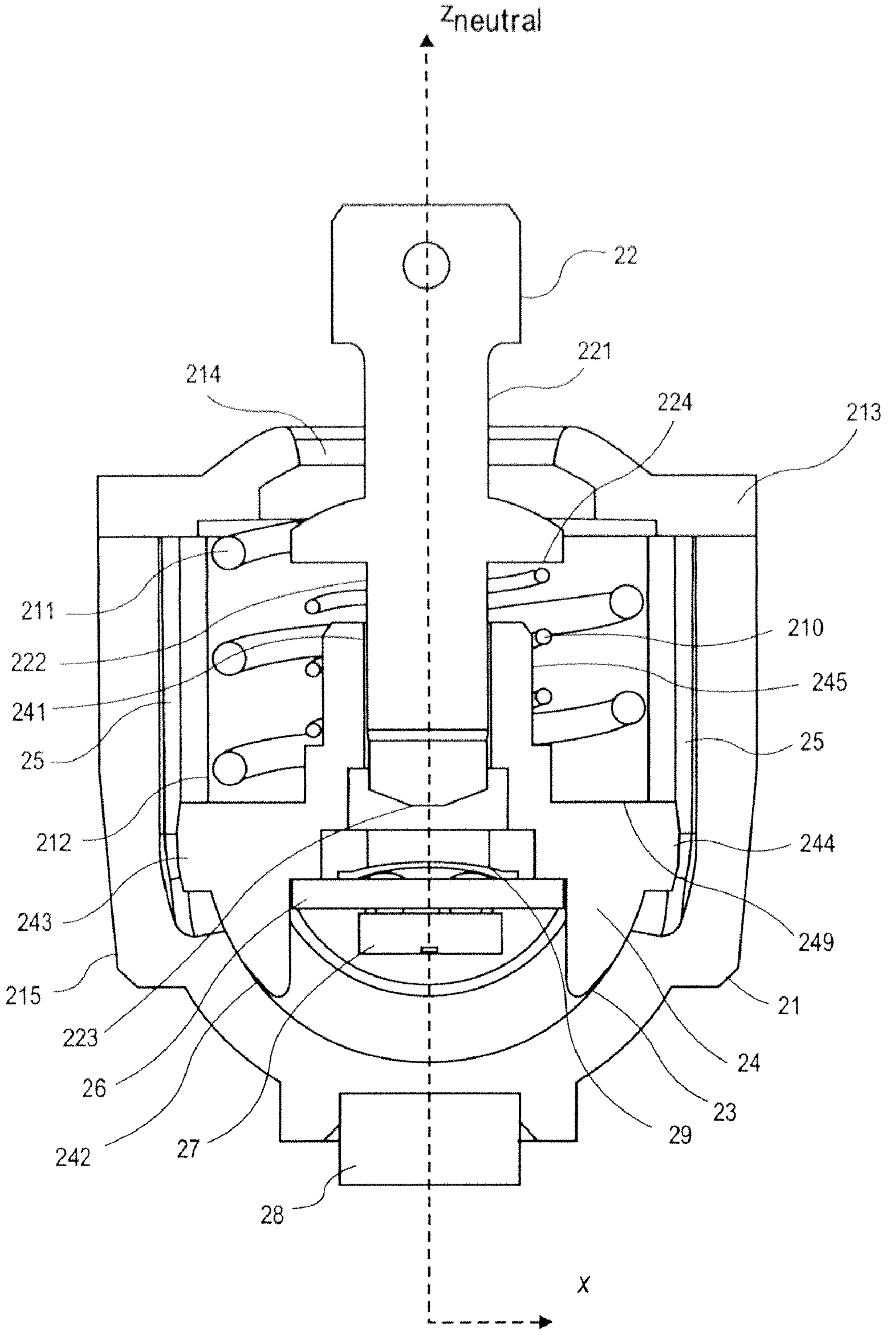
FIGS. 2A and 2B are cross-sectional views along the x and y axes of an embodiment of a mini-joystick according to the invention.
Figure 2B:
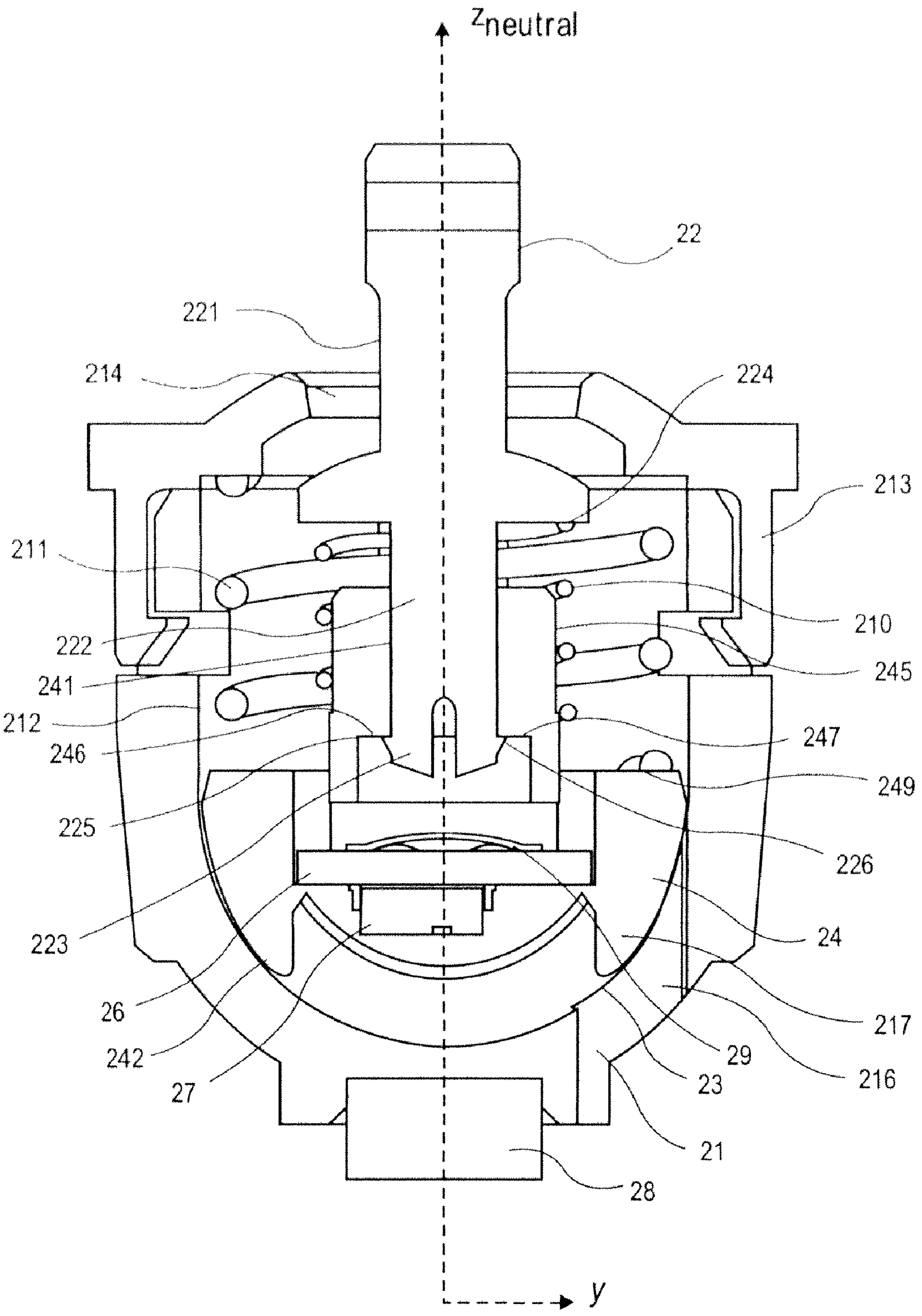

At least one of these mini-joysticks, and preferably all, may therefore be mini-joysticks according to the invention, as illustrated in FIGS. 2A and 2B, which represent a mini-joystick example, in cross-section, respectively along two perpendicular planes, corresponding to the x and y directions.

In this embodiment of the invention, the size of the mini-joystick is approximately twenty millimeters in diameter, and approximately thirty millimeters in height. It is possible to reduce the size, for example by reducing the thickness of the magnets and by using metal instead of plastic. In other applications, different dimensions can certainly be envisaged.

This mini-joystick therefore includes a body 21, defining an exterior surface of the mini-joystick, which may be lodged inside of the throttle 11. To ensure easy assembly, and therefore guiding of the mini-joystick in the receiving zone included for this purpose in the throttle 11, or more generally in the device incorporating the mini-joystick, the body 21 includes at least one guiding element 215, which protrudes, and is able to work in conjunction with a slide guide formed in the device. The protrusion may also be formed in the device, and the slide guide on the body.

This means that the mini-joystick may be embedded in said device while at the same time allowing for its removal, which makes it a simple matter to replace one "mini-joystick" module with another "mini-joystick" module. The interest in so doing is not only to facilitate after-sales service, but also to provide the ability to install the mini-joystick which best fits the use of said device and the application of the mini-joystick.

Furthermore, the replacement mini-joystick may have different features, such as, for example, a handle which protrudes less or protrudes more from its support (a handle which protrudes more from its support offers greater precision than a handle which protrudes less from its support, but also requires more dexterity, with the result being that a handle which is too long can be a drawback for certain applications and/or for persons whose fingers are relatively short), or springs with a different resistance (to select a module whose sensitivity best corresponds to the application).

The invention allows us to take into account the fact that the size of users' hands and fingers varies according to the user. The invention therefore applies to children (for example, applying a mini-joystick to a mini-gamepad) as well as to adults (for example, applying a mini-joystick to a throttle for fans of flight simulation games who have strength and dexterity).

This guiding element 215 also allows for maintaining the mini-joystick in the desired position in relation to the body, and to avoid any rotation of the body in particular.

The handle 22 is mobile, in relation to this body. It is represented here without the hat visible in FIG. 1, and which may be clipped for example to the upper section 221 of the handle.

The mini-joystick includes a ball joint providing two degrees of freedom of rotation, allowing for control of the rotational movement of the handle 22. This ball joint includes a cup 23, in which a head 24 may move. In the embodiment shown, the cup 23 is formed directly by the interior surface of the body 21. In other embodiments, of course, this may be an independent piece.

Figure 3:
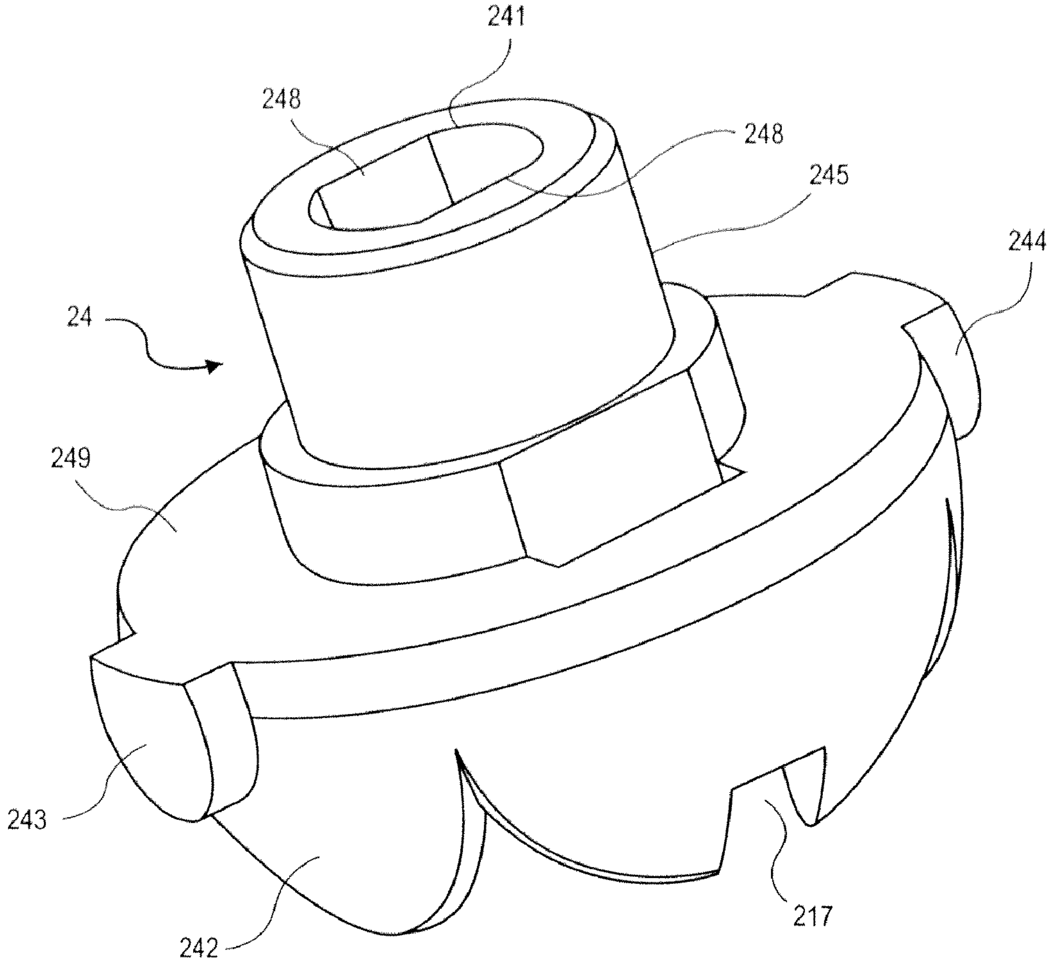
FIG. 3 illustrates the head of the ball joint of the mini-joystick shown in FIGS. 2A and 2B.

The handle 22 features a portion 222, penetrating into a slide guide 241, formed in the head 24, and aligned in the center of the head. The section of this portion 222, and of the slide guide 241, is favorably non-circular, and in this embodiment features two planes 248, so as to prevent the rotation of the handle around its axis. The head 24 features a surface 242, which comes into contact against the surface 23 of the cup, and thereby guides the rotational movement of the handle along the x and y axes. The shape of the surface 242 appears more clearly in FIG. 3, which illustrates an embodiment of the piece forming the head 24.

Two grooves 25 forming the shoulder, diametrically opposed and oriented along the z axis, are defined in the body 21, to work in conjunction with the projecting fingers forming a stop 243, 244 formed on the head, to limit its rotation along the z axis.

On the inside of the head 24 a printed circuit (PCB) 26 is attached, held in place for example by clipping, or bonding, or with screws.

According to the embodiment shown, this printed circuit 26 bears, on its lower face, a sensor 27, which is here a triaxial Hall effect sensor, working in conjunction with a magnet 28, connected, for example by clipping and/or bonding, to the body 21. In the neutral position of the handle 22, the sensor 27 and the sensing zone of element 28 are aligned along the $z_{neutral}$ axis of the handle.

The upper face of the printed circuit 26 bears a contact 29, in the shape of a dome. According to the invention, it is possible to detect a push on the handle 22. According to the embodiment shown, this detection is ensured by way of this contact 29, which is able to detect a push, or a contact on the lower section 223 of the handle 22. The handle can then slide, along its z axis, along with the portion of the bore 241, to go from a resting position (shown in FIGS. 2A and 2B) to a control position, in which the user applies a push onto the handle, resulting in contact between the lower section 223 of the handle and the contact 29.

A coil spring 210 is used, to return the handle 22 to its resting position. This coil spring is mounted in compression on an upper cylindrical section 245 of the head, and acts upon a flange 224 designed for this purpose on the handle 22. The resistance of the spring 210 depends on the application of the mini-joystick. In the case of a mini-joystick positioned on a throttle to be operated with the middle finger of an adult user, the resistance of this spring would be relatively significant, so that the user would be obliged to apply strong pressure on the hat in order to slide the handle. In the case of a mini-joystick positioned on a gamepad to be operated with a thumb, this spring 210 would offer less resistance for greater comfort of use (decreased fatigue) and taking into account the dexterity of a thumb.

According to another embodiment, we may stipulate that the contact 29 be formed by an elastic strip, carrying out this return function.

The upward movement of the handle 22 is limited, by way of the noses forming a stop 225, 226 formed on the handle, and working in conjunction with the surface elements 246, 247 of a shoulder, designed for this purpose on the head 24.

The contact 29 can of course be replaced by other push-detecting elements, such as an optical sensor. Depending on the case, the push detection may be binary (a push is either applied or not applied), or progressive, for example using a force sensor or a piezoelectric sensor. It is also possible to use a Hall effect sensor. In such a case, however, it would be important to ensure that this did not disturb the detection of movement.

A second coil spring 211 is envisaged, to return the head 24 to its neutral position, when no action is applied on the head. This spring 211 is guided along the length of the inner walls 212 of the body 21, and kept compressed by an upper section 213 of the mini-joystick, which closes up the body and is attached to the body, by clipping or with screws, for example. This upper section 213 naturally includes an opening 214, allowing for movement of the handle 22. The flange 224 is favorably sized so as to appreciably close up this opening.

The spring 211 acts on the surface 249 of the head 24, tending to return it to a horizontal position, in which the handle is in a vertical position (in the case shown in these figures), and more generally along the $z_{neutral}$ axis.

In the embodiment shown, the two springs 210 and 211 are coaxial, and share the axis of the handle 22.

In the embodiment shown, the body 21 includes a cylindrical portion and a tapered portion facilitating the insertion of a "mini-joystick" module in the receiving zone of a control device receiving said mini-joystick, such as the throttle 11, for example. The upper section 213 of the mini-joystick features a shoulder offering a support surface for the mini-joystick on the throttle 11. Subject to having previously placed and clipped, bonded or screwed a plate of a magnetic material at the end of the receiving zone of the throttle 11, the attraction between this material and the magnet may contribute to keeping the "mini-joystick" module in its receptacle. The attachment of the mini-joystick in the receptacle of the control device receiving said mini-joystick may also be carried out, for example, by clipping or with screws.

To form openings or vents in particular, the body 21 includes at least one recess 216. In the same way, the head may feature a recess 217. Some of these recesses may also allow for electrical wires to be run through.

The different elements constituting such a mini-joystick may be created using any appropriate material.

According to a particular embodiment, an optional element may be added in order to improve the action of the spring 211 (particularly if some of the elements of the mini-joystick are made of plastic). This optional element has the shape of a rigid and fine tube whose external diameter is approximately identical to the diameter of the head (excluding the projecting fingers forming a stop 243, 244 which are formed on the head) along all the length (height) of the optional element, and such tube features an internal shoulder which is located at its lower end. Hence inside of the optional element are featured a cylindrical surface along nearly all the length (height) of the optional element and an internal shoulder of low height.

The lower extremity of this optional element thus contains an internal shoulder. This upper side of this shoulder defines a rigid and plane surface of pressure for the lower extremity of the spring 211. This surface of pressure is horizontal and parallel to the surface 249 of the head 24, when the head 24 is in a resting position. This internal shoulder of the optional element extends inwards (towards the $z_{neutral}$ axis) and leaves a circular opening for the portion of the head 24 which extends over the surface 249 of the head (and it doesn't seal the events of the head 24) while defining a rigid plane circular contact area at the lower side of the internal shoulder (thus, a rigid plane circular contact area is defined at the lower side of the optional element).

This optional element is mounted sliding in relation to the body (sliding along the $z_{neutral}$ axis). The lower portion of the spring 211 is lodged inside of this optional element. The internal cylindrical surface of this optional element guides the spring 211 along the height of the optional element. The spring 211 is kept compressed between the internal shoulder of the optional element and the upper section 213 of the mini-joystick. The spring 211 acts on the upper side of this internal shoulder. Accordingly, the lower side of the optional element (i.e. the said rigid plane circular contact area) acts on the surface 249 of the head 24, tending to return it to a horizontal position, in which the handle is in a vertical position (in the case shown in these figures), and more generally along the $z_{neutral}$ axis.

If the size of the mini-joystick is approximately twenty millimeters in diameter, and approximately thirty millimeters in height, the size of the optional element is approximately six millimeters in height, the internal diameter of its upper extremity is approximately fourteen millimeters, the internal diameter of the lower extremity is approximately eleven millimeters, and the height of the internal shoulder is approximately half of a millimeter.

Other Features and Advantages of the Invention

Other variants of this embodiment may be envisaged, including:

the push-detecting function can be progressive, for example by putting in place a piezoelectric contactor on the upper face of the printed circuit;

the control sensor belongs to the group including the contacts, the optical sensors, the force sensors, the piezoelectric sensors, a Hall effect switch;

push detection is carried out in the vicinity of the upper section of the handle (which may then be non-sliding) and/or of the hat, for example using a stress sensor;

push detection is carried out on the exterior section of the body, for example, in the vicinity of the upper section of the body (the handle may then be non-sliding), for example by way of a sensor interacting with the lower section of a cover keeping the mini-joystick in the receptacle of the control device receiving said mini-joystick;

push detection is carried out in the vicinity of the lower exterior section of the body (the handle may then be non-sliding), for example by way of a stress sensor;

push detection is carried out in the vicinity of the lower section of the body (the handle may then be non-sliding, with the body being mounted sliding in relation to the housing of the device receiving the mini-joystick (for example, a gamepad)), for example using a contact, an optical sensor, a force sensor, a piezoelectric sensor, a Hall effect switch or even one or more Hall effect sensors interacting with one or more magnets;

the handle and other components feature recesses in order to reduce the mass, serve as openings or vents and/or allow for electrical wires to be run through;

the locations of the sensor and of the magnet may be reversed, and the 3D sensor replaced by several 1D or 2D sensors;

at least one of the return mechanisms is an elastic strip or piece;

the ball joint elements are reversed, the head being fixed and formed in the body or mounted on to the body, and the cup being interdependent with the handle (e.g. attached to the handle;

. . . .

The invention claimed is:

1. Mini-joystick including a handle which can be moved in relation to a body, in rotation along at least two axes of rotation, wherein said mini-joystick includes a Hall effect movement detection set including at least a first element interdependent in rotation with said handle and at least a second element fixed in relation to said body, said elements belonging to the group including the sensors and the magnets, delivering at least one item of information regarding the position of said handle, and at least one detection means for detecting at least one push applied on the upper section of said handle, able to deliver at least one item of control information when a push is applied, whatever the position of said handle in relation to said body.

2. Mini-joystick according to claim 1, wherein said handle includes at least one element mobile and sliding along the axis of said handle or along the axis of said body, so as to allow for at least one resting position and at least one control position, in which said detection means delivers an item of control information.

3. Mini-joystick according to claim 1, wherein said detection means includes at least one sensor of stress applied onto said handle.

4. Mini-joystick according to claim 1, wherein is featured at least one ball joint including two ball joint elements of roughly the same radius, namely a head and a cup, one of the elements being able to pivot around the center of the other element, a first of said ball joint elements being fixed in relation to said body, and a second of said ball joint elements being interdependent with said handle.

5. Mini-joystick according to claim 4, wherein said cup is formed in said body or piece attached to said body, and wherein said head is guided in movement in relation to said cup by said handle.

6. Mini-joystick according to claim 5, wherein said head features at least one slide guide, in which a portion of said handle is mobile in sliding and/or whereby the receiving zone of a control device receiving said mini-joystick features at least one slide guide, in which at least a portion of said body is mobile in sliding.

7. Mini-joystick according to claim 4, wherein said cup is formed in said body, and whereby said body features a shoulder able to work in conjunction with a stop formed by said head to limit the latter's movement.

8. Mini-joystick according to claim 1, wherein said detection means includes a control sensor mounted:

either on a support interdependent in rotation with said handle, and therefore interacting with the portion of said handle which is mobile in sliding;

or on a support interdependent with a receiving zone of a control device receiving said mini-joystick, and interacting with the portion of said body which is mobile in sliding.

9. Mini-joystick according to claim 8, wherein:

when said control sensor is mounted on said support interdependent in rotation with said handle, it is mounted in such a way that it extends in line with said handle, whatever the position of said handle in relation to said body;

when said control sensor is mounted on said support attached to a receiving zone of a control device receiving said mini-joystick, it is mounted in such a way that it is able to work in conjunction with the portion of said body which is mobile in sliding, whatever the position of said handle in relation to said body.

10. Mini-joystick according to claim 9, wherein said control sensor belongs to the group including:

the contacts, and for example the push buttons;

the optical sensors;

the force sensors;

the piezoelectric sensors;

a Hall effect switch.

11. Mini-joystick according to claim 8, wherein said head includes an interior space to lodge said support interdependent in rotation with said handle.

12. Mini-joystick according to claim 8, wherein said support is a printed circuit also including at least one of said first elements of said movement detection set.

13. Mini-joystick according to claim 8, wherein the head includes holding means by way of clipping of said handle and/or of said support.

14. Mini-joystick according to claim 8, wherein the head and/or the body include recesses.

15. Mini-joystick according to claim 1, wherein said Hall effect movement detection set includes a triaxial sensor and a magnet to deliver positional information along said two axes.

16. Mini-joystick according to claim 15, wherein said Hall effect movement detection set includes a single triaxial sensor and a single magnet to deliver positional information along said two axes.

17. Mini-joystick according to claim 16, wherein said sensor and said magnets are aligned along the axis of said handle, when the handle is in a neutral position.

18. Mini-joystick according to claim 1, wherein are included primary return mechanisms, tending to return at least said upper section of said handle to a resting position, in which no push is detected.

19. Mini-joystick according to claim 18, wherein said primary and secondary return mechanisms include two concentric coil springs.

20. Mini-joystick according to claim 1, wherein are included secondary return mechanisms, tending to return said handle to a neutral position, in which no rotational movement is applied.

21. Mini-joystick according to claim 1, wherein the exterior surface of said body includes at least one guiding or holding element, able to work in conjunction with a receiving zone of a control device receiving said mini-joystick.

22. Control device equipped with at least one mini-joystick according to claim 1.

23. Mini-joystick including a handle which can be moved in relation to a body, in rotation along at least two axes of rotation, wherein said mini-joystick includes at least one ball joint including two ball joint elements of roughly the same radius, namely a head and a cup, one of the elements being able to pivot around the center of the other element, a first of said ball joint elements being fixed in relation to said body, and a second of said ball joint elements being interdependent with said handle, a Hall effect movement detection set including at least a first element attached on the inside of the said second of said ball joint elements and interdependent in rotation with this ball joint element, and at least a second element fixed in relation to said first of said ball joint elements, said elements belonging to the group including the sensors and the magnets, delivering at least one item of information regarding the position of said handle, at least one detection means for detecting at least one push applied on the upper section of said handle, able to deliver at least one item of control information when a push is applied, whatever the position of said handle in relation to said body.

* * * * *